US012583200B2

(12) United States Patent
Fustinoni et al.

(10) Patent No.: US 12,583,200 B2
(45) Date of Patent: Mar. 24, 2026

(54) METHOD FOR FORMING A CREASING ON A PAPER ITEM AND PAPER ITEM PROVIDED WITH A CREASING

(71) Applicant: SEI S.P.A., Curno (IT)

(72) Inventors: Ettore Fustinoni, Curno (IT); Ettore Colico, Curno (IT)

(73) Assignee: SEI S.p.A., Curno (IT)

(*) Notice: Subject to any disclaimer, the term of this patent is extended or adjusted under 35 U.S.C. 154(b) by 179 days.

(21) Appl. No.: 18/390,237

(22) Filed: Dec. 20, 2023

(65) Prior Publication Data

US 2024/0208174 A1 Jun. 27, 2024

(30) Foreign Application Priority Data

Dec. 21, 2022 (IT) ........................ 102022000026373

(51) Int. Cl.
*B31F 1/08* (2006.01)

(52) U.S. Cl.
CPC ...................................... *B31F 1/08* (2013.01)

(58) Field of Classification Search
CPC . B31F 1/08; B31B 50/25; B31B 50/26; B31B 2100/00; B65D 5/4266
USPC ........................................................... 270/32
See application file for complete search history.

(56) References Cited

U.S. PATENT DOCUMENTS 3,228,710 A * 1/1966 Tadeusz ................. B65H 45/28
229/92.1
2013/0048704 A1* 2/2013 Lewis .................. B65D 5/0015
229/190
2014/0374281 A1* 12/2014 Rodrigues ............ A45C 11/324
206/38.1
2020/0207508 A1* 7/2020 Kansburg ............. B65D 5/0209

FOREIGN PATENT DOCUMENTS

DE 20010593 U1 9/2000
EP 2860024 A1 4/2015
EP 2704898 B1 11/2019

* cited by examiner

*Primary Examiner* — Leslie A Nicholson, III

(57) ABSTRACT

A method for forming a creasing (10) on a paper item (1) comprises: providing a predetermined pattern to be marked on the paper item; marking said pattern on a surface (S) of said paper item to provide a score line (2, 3, 4) on said paper item; wherein said pattern comprises at least one score line (2) which extends alternatively along opposed directions with respect to a centreline (C), and which defines adjacent portions (5*a*, 5*b*) of said paper item; and folding said paper item such that said adjacent portions (5*a*, 5*b*) project at least partially outwards with respect to the surface (S) of the paper item outside said adjacent portions (5*a*, 5*b*).

16 Claims, 7 Drawing Sheets

Figure 1 - Prior Art

METHOD FOR FORMING A CREASING ON A PAPER ITEM AND PAPER ITEM PROVIDED WITH A CREASING

RELATED APPLICATION

This application claims priority to and the benefit of Italian Application No. 102022000026373, filed 21 Dec. 2022 the contents of which are incorporated herein by reference in its entirety.

TECHNICAL FIELD

The present invention is directed to a method for the formation of a creasing on a paper item, and to paper item provided with a creasing. The present invention concerns more in general the field of "paper processing industry", which term is herein and in the following intended for the use and transformation and/or decoration of paper items, such as cardboard, card stock, corrugated cardboard and like materials, for example for providing folds to make boxes, receptacles and the like for example for packaging and micro-packaging, and for the impression of decorations, wording, symbols or pattens in general, on said materials, from portions of material that are appropriately namely folded, cut and/or decorated.

BACKGROUND

Methods for forming a creasing on a paper item are known in the field of paper industry, for example for the production of boxes or containers, or packaging in general.

Creasings allow to facilitate the operation of folding paper items such as cardboard or corrugated cardboard, in order to form a structure that can be folded into a box or container through folding/unfolding actions.

In the known art, creasings are formed by weakening the paper item material along the direction of the fold lines.

Known methods comprise the use of a laser apparatus for scoring or engraving a paper based material, on which a laser beam marks a pattern for forming a folding line. The laser beam cuts partially into the thickness of the paper item, and not completely through it.

Generally, the pattern marked by the laser beam comprises a straight line, or two or more parallel straight lines, as shown by way of example in FIG. 1 showing a paper item comprising a creasing formed with known methods.

Additionally methods are also known including score lines that are not parallel straight lines.

Document EP2860024A1 discloses a cardboard based material, in corrugated form, on which penetration is operated by a laser cutting apparatus defining a pattern which forms a folding line. Said cut has a limited magnitude, in the range of tenths of millimetres, and the cut lines are normally in pairs running in parallel with lines that can have different forms such as herringbone, o-shaped, s-shaped, x-shaped patterns.

Similarly document DE20010593U1 discloses a corrugated cardboard base for the production of industrial packaging foldable containers with folding lines, arranged so as to allow folding in the inward direction, towards the inside of the container. Each folding line is provided with parallel spaced cuts on each side of the folding line connected by additional spaced diagonal cuts.

Weakening processes in the state of the art can also be determined by promoting changes in the structure of the paper item material and its layers, resulting in the weakening of said paper item material and the lowering of its mechanical properties.

In particular, known methods for forming creasing is carried out by making one or more laser engravings, or laser scoring, for forming score lines, in order to facilitate the fold. However, by the known process score lines are formed so that material is removed which facilitates folding, on the other hand the structure of the folded paper item, for example for forming a box, is weakened.

A drawback of the known methods is that the weakening processes of the paper item operated by the laser apparatus along the folding lines, results in lowering of the mechanical properties of the paper item.

For example, the weakening process can produce discontinuities in the paper material along the folding line, causing undesired tears and separation of material portions negatively affecting the functional and aesthetic features of the paper item.

Another disadvantage of the known paper items, obtained with known method, is that when a force is applied to the folded paper item, e.g. a folded box, the creasing does not effectively withstand the force and the surface of the folded box can collapse.

Additionally, the creasing provided on known paper items, comprising a weakening of the folding line, results in the undesired effect of stretching the external fibers of the paper item when it is folded, consequently loosing consistency and, in the case of painting, there is the risk of breaking it.

An object of the present invention is to provide a method to form a creasing on a paper item which facilitates folding of the paper item, and on the other hand reinforces the structure of the folded paper item, for example for forming a box.

A further object of the present invention is to provide a method to form a creasing on a paper item avoiding any undesired mechanical stress or deformation of the paper item material resulting from the weakening of the folding line provided with the known methods.

A further object of the present invention is to provide a method to form a creasing on a paper item which avoids the undesired effect of stretching the external fibers of the paper item when it is folded.

A further object of the present invention is to provide a method that allows a quick, flexible and cost-effective formation of a creasing on a paper item, and in particular a quick, flexible and cost-effective marking of the score line on the paper item.

SUMMARY OF THE INVENTION

These and other aims are achieved by a method forming a creasing on a paper item and a paper item according respectively to independent claims 1 and 13. Additional features and aspects of the method and of the paper item according to the invention are disclosed in the dependent claims.

It has to be noted that features claimed and/or disclosed with reference to the method for forming a creasing on a paper item are applicable to the paper item, and vice versa. In particular, it has to be noted that features claimed and/or disclosed with reference to the method step of marking a predetermined pattern are applicable to the paper item having a predetermined pattern marked on a surface of the paper item.

The method for forming a creasing on a paper item according to the present invention comprises the step of providing a predetermined pattern to be marked on the paper item, the step of marking said predetermined pattern on a surface of the paper item to provide at least one score line on the paper item; wherein said pattern comprises at least one score line which extends alternatively along opposed directions with respect to a centreline and which defines adjacent portions of the paper item. The method comprises the step of folding the paper item such that said adjacent portions project at least partially outwards with respect to the surface of the paper item outside said adjacent portions.

It has to be noted that the wording "score line" has to be intended as a line which is marked, or scored, or engraved on the paper item, for example by a laser beam, that cuts partially the paper item within its thickness, and not completely through it. According to an aspect, the at least one score line which extends alternatively along opposed directions with respect to a centreline defines a zigzag pattern, i.e. a pattern made up of line segments forming corners at variable or constant angles, between two parallel lines.

Advantageously the presence of a score line which extends alternatively along opposed directions with respect to a centreline and which defines adjacent portions projecting at least partially outwards with respect to the surface of the paper item allows overcoming the drawbacks of the prior art.

In fact, as briefly discussed above traditional processes for forming creasing is carried out by making one or more laser engravings (laser scoring for forming score lines) in order to facilitate the fold. However, by the known process score lines are formed so that material is removed which facilitates folding, on the other hand the structure of the folded paper item, for example for forming a box, is weakened. Contrary to the prior art, according to an aspect of the present invention, the adjacent portions that project at least partially are provided, in other words the adjacent portions are extroflecting, thus after the paper item is folded the adjacent portions cooperates one to another to increase strength of the folded paper item, for example of the box formed with the paper item.

In fact, the creasing formed on the paper item is not weakened. On the contrary, each portion formed by the marked score line cooperate with the adjacent portion projecting outward the surface of the paper item, thus providing a mutual supporting effect between the adjacent portions.

For example, when a force is applied to the folded paper item, e.g. a folded box, the adjacent portions are in contact one to another, thus the creasing effectively withstand the force having the adjacent portions in contact one to another, thus providing a mutual supporting effect one to another.

Additionally, the presence of adjacent portions projecting at least partially outwards allows to effectively reduce or eliminate the undesired effect of the prior art creasing process wherein the external fibers of the paper item stretch, losing consistency and, in the case of painting, there is the risk of breaking it.

In fact, according to the present invention, external fibers of the paper item at the creasing are subject to a reduced stretching effect due to the presence of the adjacent portions projecting outwardly that strengths the creasing while facilitating the folding step of the paper item.

According to aspect of the present invention the adjacent portions comprise anchoring parts that remain attached to the paper item and end parts that project at least partially outward with respect to the surface of the paper item outside said adjacent portions.

It has to be noted that the wording "outside the adjacent portions" means the area of the paper item which does not comprise the adjacent portions.

In other words, when the paper item is folded, the adjacent portions project at least partially outwards with respect to the surface of the paper item which is not marked or deformed by the creasing, i.e. which is arranged externally with respect to the pattern defined by the score line.

An advantage of this arrangement is providing an effective extroflection of the adjacent portions projecting outwardly the surface of the paper item having an anchoring portion that behaves as a hinge for the portion that is formed by the score line thus allowing an effectively projection of the end part.

According to an aspect of the present invention the anchoring parts and/or the end parts of two or more adjacent portions, preferably of all the adjacent portions, are equidistant from the centreline. Advantageously this provide an extension of the adjacent portions that is equal for the adjacent portions so that when the paper item is folded, preferably substantially along the centreline, the end portions are projecting outwards in the same ways for two or more adjacent portions, preferably for all the adjacent portions.

According to an aspect of the present invention the anchoring parts and the end parts are alternating along the direction of extension of the centreline.

Advantageously the alternation of the adjacent portions allows effectively obtaining the supporting strengthen effect of one projecting portion with another.

According to an aspect of the present invention the anchoring part and the end part of each adjacent portion are arranged at opposite sides of said centreline.

According to an aspect of the present invention the centreline divides each adjacent portion such that the anchoring part and at least part of the end part of each said adjacent portion are arranged in opposite positions relative to the centreline.

An advantage of this arrangement is that each adjacent portion is extending across the centreline, so that when folding of the paper item carried out, preferably substantially along the centreline, each adjacent portion extend substantially across the whole creasing width (direction perpendicular with respect to the centreline) thus effectively reducing or eliminating the undesired weakening effect of the score line of the known process.

According to an aspect of the present invention the at least one score line which extends alternatively along opposed directions with respect to a centreline defines adjacent portions having a complementary shape, preferably having a complementary shape along the arrangement in succession of the adjacent portions in the direction of extension of the centreline.

According to an aspect of the present invention each adjacent portion has a tapered configuration in the direction from its anchoring part to its end part.

According to an aspect of the present invention each adjacent portions has a substantially triangular shape.

Advantageously, the complementary shape and/or tapered shape (preferably triangular) of the adjacent portions, has been identified to provide an effective supporting effect of adjacent portions one to another.

According to an aspect of the present invention after said step of folding the paper item is extending along at least two planes that are incident one to another and wherein the adjacent portions project at least partially with respect to said plane along which at least a portion of the paper item is extending when folded.

Advantageously, as also mentioned above, the creasing formed on the paper item is not weakened. On the contrary, each portion formed by the marked score line cooperate with the adjacent portion projecting outward the plane along which at least a portion of the paper item is extending when folded, thus providing a mutual supporting effect between the adjacent portions.

According to an aspect of the present invention the step of marking the predetermined pattern on a surface of the paper item to provide at least one score line is carried out by means of a laser beam.

This allows a quick, flexible and cost-effective process for marking the predetermined pattern on the paper item.

According to an aspect of the present invention the at least one score line of said predetermined pattern has a depth comprised between 20% and 60% of the thickness of the paper item, preferably between 40% and 50% of the thickness of the paper item. Advantageously, the depth of the score line up to 50% of the thickness of the paper item allows providing adjacent portions that can effectively projects outwardly the surface of the paper item while avoiding any undesired weakening effect of the creasing.

The present invention further relates to a method for forming a creasing on a paper item comprising the following steps:

- providing a predetermined pattern to be marked on the paper item;
- marking said predetermined pattern on a surface of said paper item to provide at least one score line on said paper item; wherein said pattern comprises at least one score line which extends alternatively along opposed directions with respect to a centreline, and which defines adjacent portions of said paper item,
- wherein the step of marking said predetermined pattern on a surface of said paper item to provide at least one score line is carried out by means of a laser beam.

Furthermore, the present invention relates to a machine for providing a method for forming a creasing on a paper item, comprising a laser apparatus.

Advantageously, marking by means of a laser apparatus allows a quick, flexible and cost-effective process for marking the predetermined pattern on the paper item.

The present invention also relates to a paper item comprising a predetermined pattern marked on a surface of the paper item, preferably by means of a method herein disclosed and/or claimed, to provide at least one score line for forming a creasing, wherein the pattern comprises at least one score line which extends alternatively along opposed directions with respect to a centreline, and which defines adjacent portions of said paper item, wherein said at least one score line of said predetermined pattern has a depth comprised between 20% and 60% of the thickness of the paper item, preferably between 40% and 50% of the thickness of the paper item.

Advantageously, the depth of the score line up to 50% of the thickness of the paper item allows providing adjacent portions that can effectively projects outwardly the surface of the paper item while avoiding any undesired weakening effect of the creasing Advantageously the pattern comprising at least one score line which extends alternatively along opposed directions with respect to a centreline and which defines adjacent portions of the paper item allows forming adjacent portions projecting at least partially outwards with respect to the surface of the paper item outside said adjacent portions when in use the paper item is folded, preferably substantially along the centreline.

According to aspect of the present invention in the paper item the adjacent portions comprise anchoring parts that remain attached to the paper item and end parts that project at least partially outward with respect to the surface of the paper item outside said adjacent portions.

According to an aspect of the present invention in the paper item the anchoring parts and/or the end parts of two or more adjacent portions formed by the score line marked on the paper item, preferably of all the adjacent portions, are equidistant from the centreline.

According to an aspect of the present invention in the paper item the anchoring parts and the end parts are alternating along the direction of extension of the centreline.

According to an aspect of the present invention in the paper item the anchoring part and the end part of each adjacent portion are arranged at opposite sides of said centreline.

According to an aspect of the present invention in the paper item the centreline divides each adjacent portion such that the anchoring part and at least part of the end part of each said adjacent portion are arranged in opposite positions relative to the centreline.

According to an aspect of the present invention in the paper item the at least one score line which extends alternatively along opposed directions with respect to a centreline defines adjacent portions having a complementary shape, preferably having a complementary shape along the arrangement in succession of the adjacent portions in the direction of extension of the centreline According to an aspect of the present invention in the paper item each adjacent portion has a tapered configuration in the direction from its anchoring part to its end part.

According to an aspect of the present invention in the paper item each adjacent portions has a substantially triangular shape.

According to an aspect of the present invention in the paper item the at least one score line of said predetermined pattern has a depth up to 50% of the thickness of the paper item.

Advantages discussed with respect to features/aspects of the pattern and the score line formed on the paper item disclosed/claimed herein with respect to the method are applicable to the paper item comprising a predetermined pattern marked thereon.

BRIEF DESCRIPTION OF THE DRAWINGS

Further features and advantages of the invention will be disclosed in the following description, provided herein by way of example only, and without limitations, with reference to the accompanying figures, in which.

DETAILED DISCLOSURE OF THE PRESENT INVENTION

Figure 1:
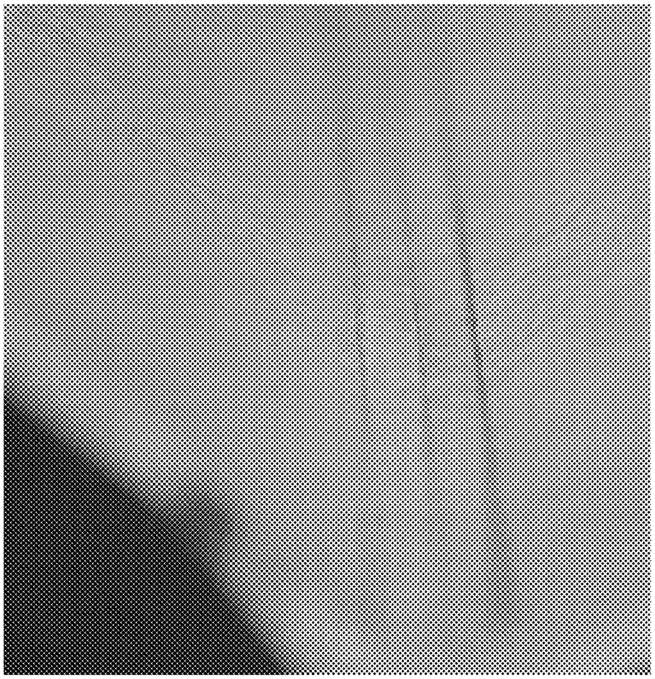
FIG. 1 shows a paper item comprising a creasing according to the known art.

FIGS. 2-6 show possible embodiments of a paper item 1 comprising a predetermined pattern marked on a surface S of said paper item 1, to provide at least one score line 2, 3, 4.

According to a possible embodiment, the at least one score line 2, 3, 4 is marked on the paper item 1 by means of a laser apparatus 100, for example a CO2 laser.

According to a possible embodiment the laser beam has a wavelength comprised between 9,2 and 10,6 μm.

In particular, according to an embodiment, the CO2 laser produces a laser beam of infrared light with the principal wavelength bands centred on 9,6 and 10,6 μm.

Preferably, the CO2 laser generates an output power comprised between 30 W and 2000 W, preferably comprised between 300 W and 1000 W.

According to possible embodiments, the laser beam generated by the laser has a spot size comprised between 0.08 and 0.4 mm, preferably between 0.1 and 0.2 mm, more preferably equal to 0.2 mm.

It has to be noted that the wording "score line" has to be intended as a line which is marked, or scored, or engraved on the paper item 1 by a laser beam within the thickness of the paper item, and not completely through its thickness. In other words the score line is arranged only on one surface of the paper item.

The pattern provided on the paper item 1 comprises at least one score line 2 which extends alternatively along opposed directions with respect to a centreline C of the pattern, and which defines adjacent portions 5*a*, 5*b* of said paper item 1.

With reference for example to FIG. 2, 2A, 2B and 3, the at least one score line 2 which extends alternatively along opposed directions with respect to a centreline C defines a zigzag pattern, i.e. a pattern made up of line segments forming corners at variable or constant angles, between two parallel lines.

In this way, the adjacent portions 5*a*, 5*b* defined by the score line 2 have a complementary shape, preferably along the arrangement in succession of the adjacent portions 5*a*, 5*b* in the direction of extension of the centreline C.

In other words, the score line 2 forms adjacent portions 5*a*, 5*b* which have complementary shape if observed in succession along the direction of extension of the centreline C.

According to a possible embodiment, each adjacent portion 5*a*, 5*b* has a tapered configuration, preferably a substantially triangular shape.

It has to be noted that the cardboard shown in the figures is only an example of the possible paper items of the paper processing industry which can be provided with a creasing with the method according to the present invention. Other paper items can be corrugated cardboard, card stock and like materials.

In general, according to the invention, the paper item 1 has a planar extension before being marked and folded.

As will be better explained in the following, in relation to the method according to the invention, when the pattern is marked on the surface of the paper item 1 in order to provide a crease 10, so that the paper item can be easily folded.

In a possible embodiment, the adjacent portions 5*a*, 5*b* comprise anchoring parts 6 that, after folding the paper item 1, remain attached to the paper item 1 and end parts 7 that project at least partially outward with respect to the surface S of the paper item outside said adjacent portions 5*a*, 5*b*.

With reference for example to FIGS. 2B, 4 and 5A-5B, after folding the paper item 1, it results folded along the creasing 10 for extending along at least two planes P1, P2 that are incident one to another, and wherein the adjacent portions 5*a*, 5*b* project at least partially with respect to the planes P1, P2 along which at least a portion of the paper item 1 is extending when folded.

In a possible embodiment, shown in FIGS. 2B, 4 and 5A-5B, the at least two planes P1, P2 are incident one to another preferably at an angle of substantially 90°, and the adjacent portions 5*a*, 5*b* project at least partially with respect to the planes P1, P2 along which at least a portion of the paper item 1 is extending when folded.

As above mentioned, according to a possible embodiment, each adjacent portion 5*a*, 5*b* has a tapered configuration in the direction from its anchoring part 6 to its end part 7, preferably a substantially triangular shape.

With reference to the attached figures, each adjacent portion 5*a*, 5*b* has a substantially triangular shape, wherein the anchoring part is the base of the triangle and the end part 7 comprises the vertex opposed to the base of the triangle.

It has to be noted that the anchoring parts 6 are areas of the adjacent portions 5*a*, 5*b* which do not comprise the at least one score line 2 which extends alternatively along opposed directions with respect to a centreline C of the pattern, and which defines adjacent portions 5*a*, 5*b* of the paper item.

In this way, as will be better discussed in relation to the method according to the invention, the paper item 1 can be folded along the anchoring parts 6 which remain attached to the surface S of the paper item 1.

Figure 2:
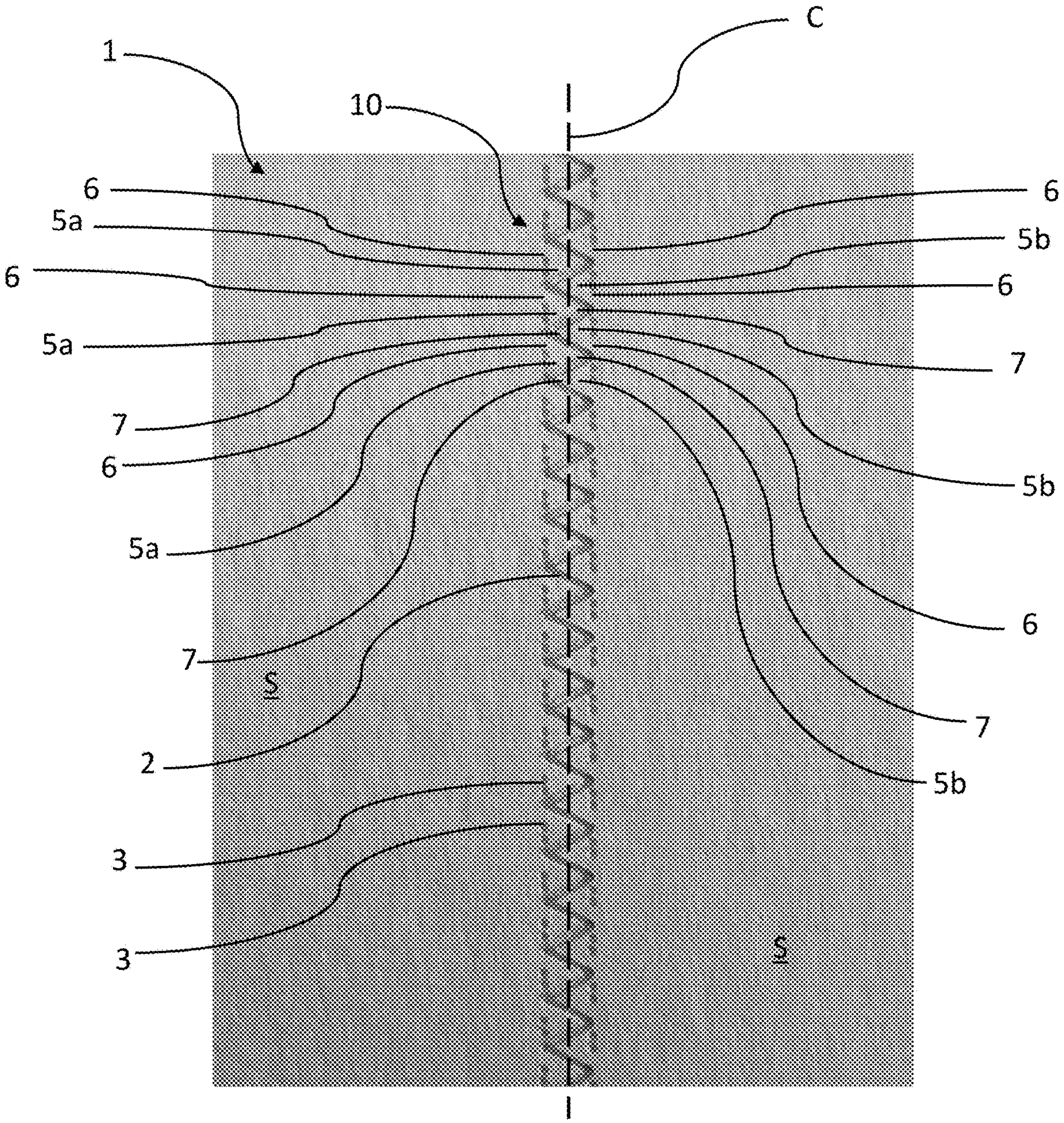
FIGS. 2, 2A and 2B show a possible embodiment of a paper item comprising a creasing according to the invention respectively in its flat configuration with adjacent portions not projecting outwards with respect to the surface of the paper item (FIG. 2), in its flat configuration with adjacent portions projecting at least partially outwards with respect to the surface of the paper item (FIG. 2A), and in its folded configuration with adjacent portions projecting at least partially outwards with respect to the surface of the paper item (FIG. 2B)
Figure 2A:
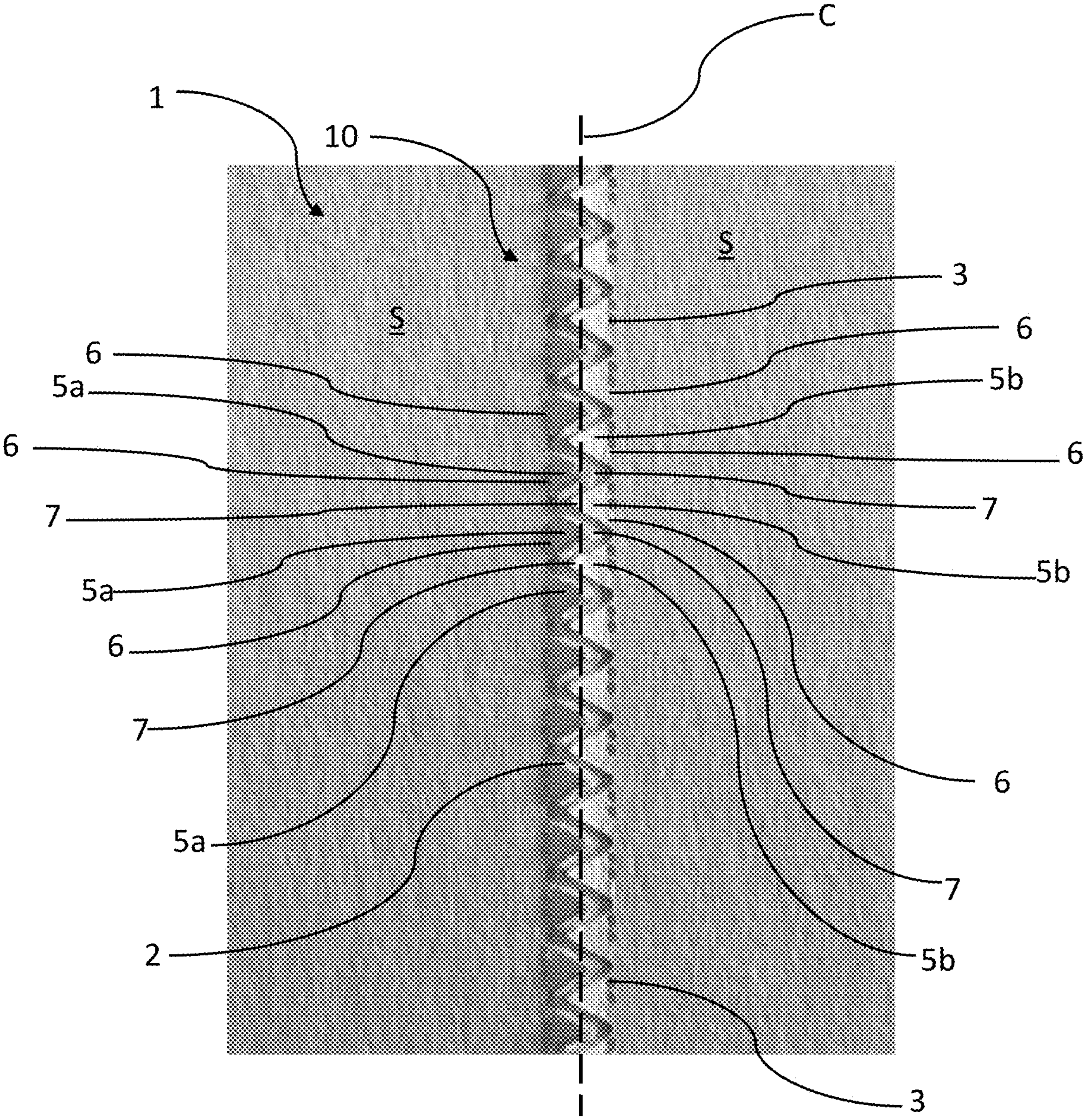
Figure 2B:
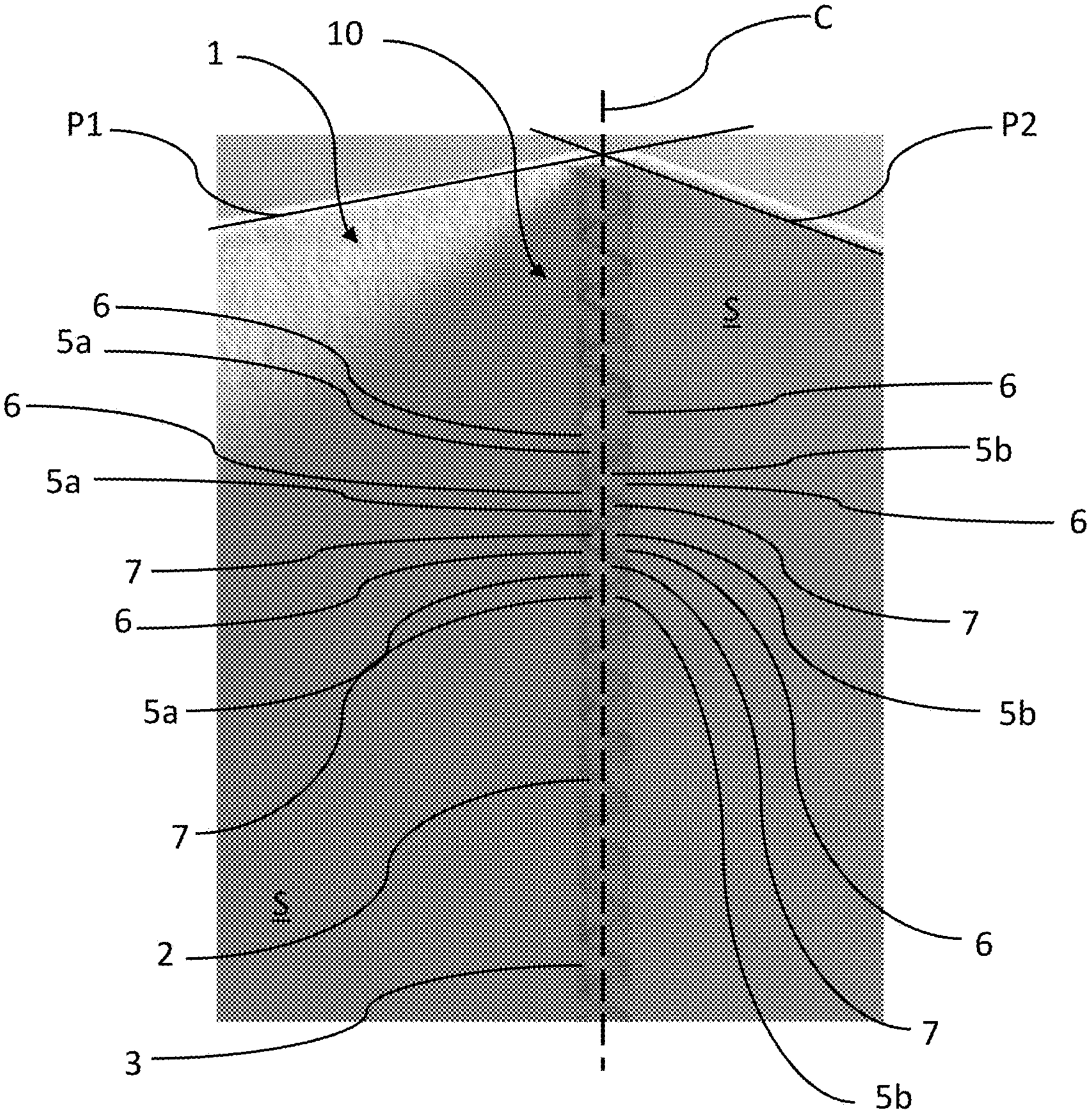

Nevertheless, according to a possible embodiment, shown by way of example in FIGS. 2, 2A and 2B, the anchoring parts 6 can comprise at least one score dot 3, preferably a couple of score dots 3, such that the paper item 1 can be folded along the anchoring parts 6 which remain attached to the surface S of the paper item 1.

The score dots 3 are dots which are marked, or scored, or engraved along the longitudinal direction of extension of the anchoring part 6 by a laser beam that cuts partially into the paper item thickness, and not completely through its thickness.

According to a further possible embodiment, shown by way of example in FIGS. 3, 4 and 5A-5B, the anchoring parts 6 can comprise at least one straight line 4, such that the paper item 1 can be folded along the straight lines 4 of the anchoring parts 6 which remain attached to the surface S of the paper item 1.

Also the straight lines 4 are lines which are marked, or scored, or engraved along the longitudinal direction of extension of the anchoring part 6 by a laser beam that cuts partially into the paper item thickness, and not completely through its thickness. It has to be noted that according to a possible embodiment, the score dots 3 and/or the straight lines 4 of the anchoring parts 6 have a lower depth in the surface S of the paper item 1 than the depth reached by the first score line 2 which extends alternatively along opposed directions with respect to a centreline C of the pattern, and which defines adjacent portions 5*a,* 5*b* of the paper item.

With reference to FIGS. 2, 2A, 2B and 3, the anchoring parts 6 of two adjacent portions 5*a,* 5*b* are equidistant from the centreline C.

In particular, the anchoring parts 6 have respective midpoints which have the same distance d from the centreline C, measured from the midpoint to the centreline C along a transverse direction with respect to the direction of extension of the centreline C.

In a possible embodiment, the anchoring parts 6 comprise respective line segments of paper item 1 anchored to the surface S, having respective midpoints which are equidistant from the centreline C.

In a possible embodiment, the anchoring parts 6 and the end parts 7 are alternating along the direction of extension of the centreline C.

Figure 3:
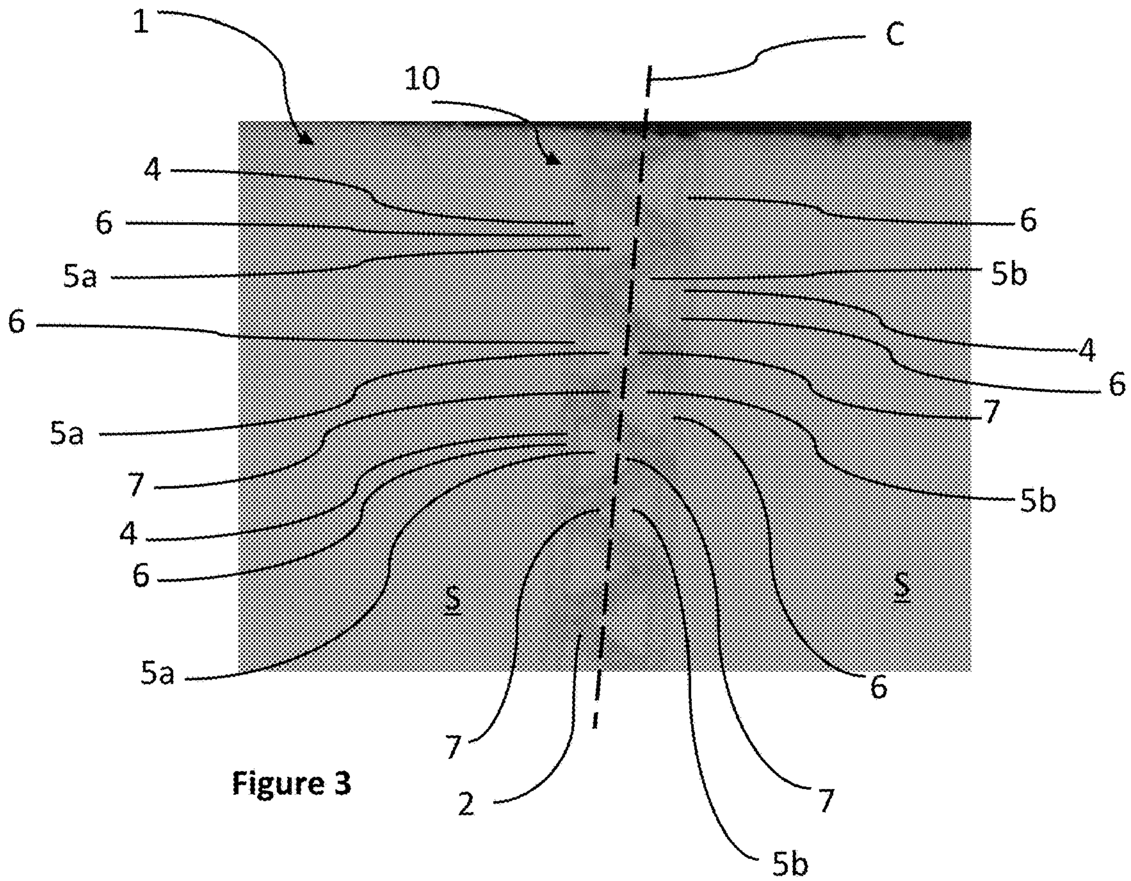
FIG. 3 shows a further possible embodiment of a paper item comprising a creasing according to the invention.
Figure 4:
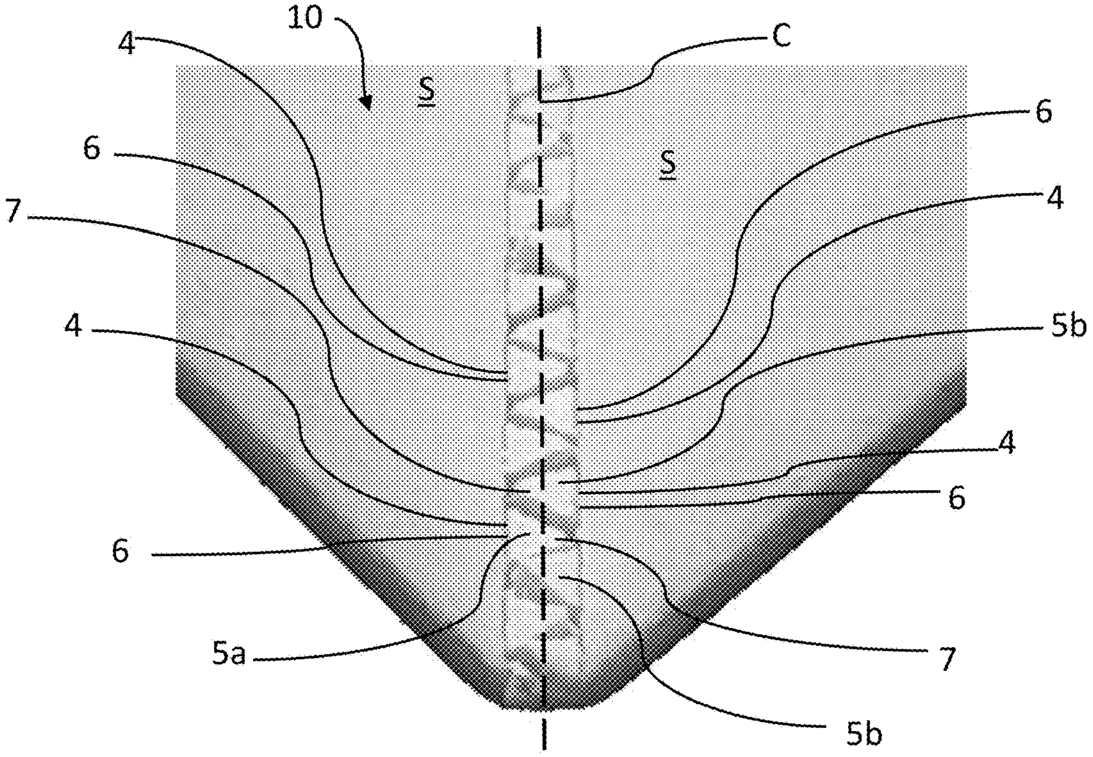
FIG. 4 shows the internal surface of a possible embodiment of a paper item comprising a creasing according to the invention in its folded configuration.
Figure 5A:
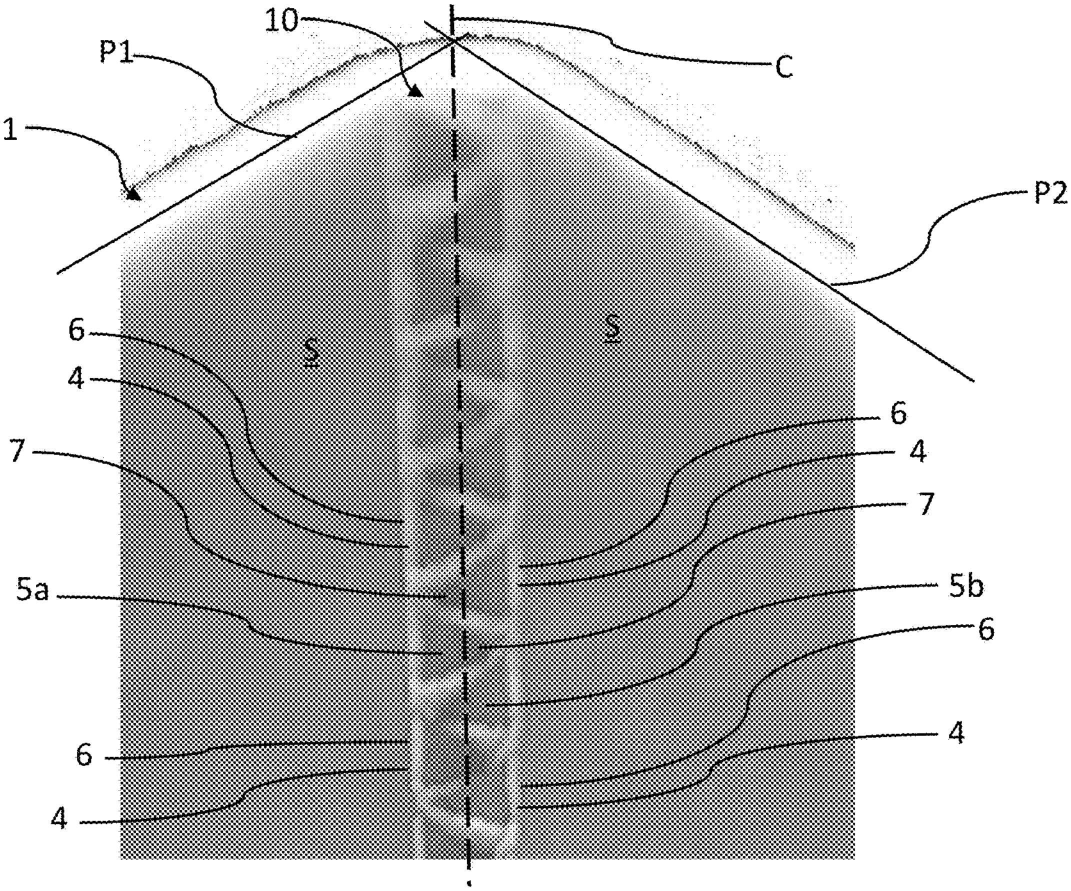
FIGS. 5A and 5B show top views of the internal surface of a possible embodiment of a paper item comprising a creasing according to the invention in its folded configuration.
Figure 5B:
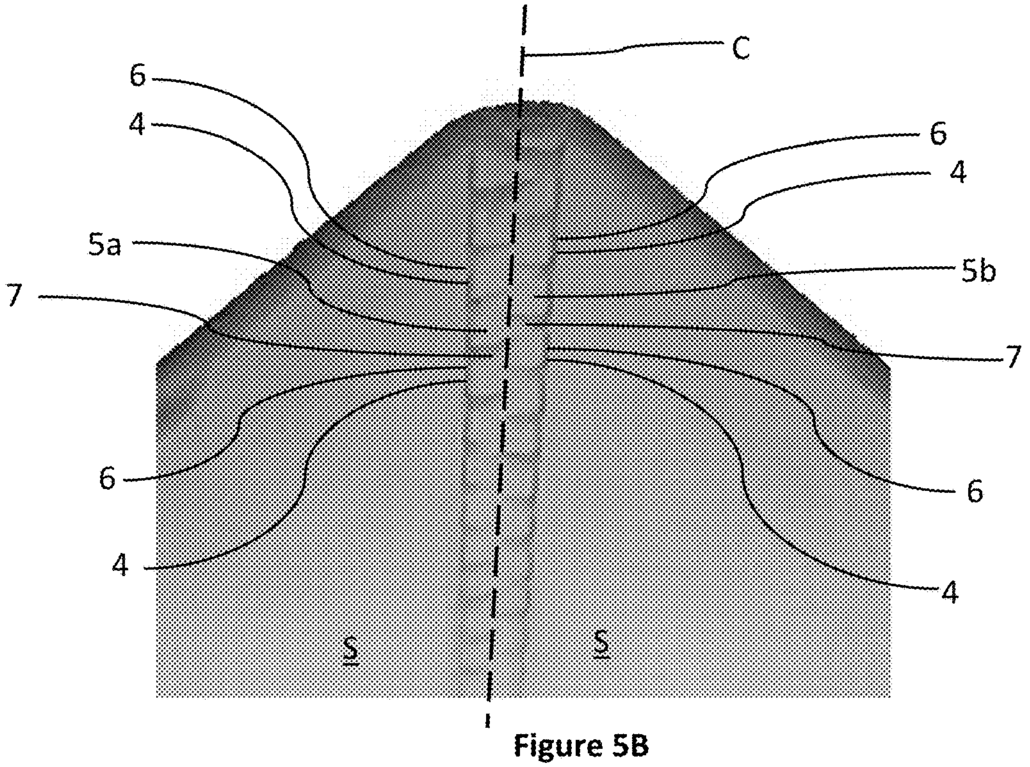

With reference for example to FIG. 2A and 3, the anchoring part 6 and the end part 7 of each adjacent portion 5*a,* 5*b* are arranged at opposite sides of said centreline C.

In other words, the centreline C divides each adjacent portion 5*a,* 5*b* such that the anchoring part 6 and at least part of the end part 7 of each adjacent portion 5*a,* 5*b* are arranged in opposite positions relative to the centreline C.

The present invention further relates to a method for forming a creasing 10 on a paper item 1, comprising a first step of providing a predetermined pattern to be marked on the paper item 1.

The method according to the invention comprises the second step of marking the predetermined pattern on a surface S of the paper item 1 to provide at least one score line 2, 3, 4 on the paper item 1.

In a possible embodiment, the pattern can be marked on the paper item 1 by means of a laser apparatus 100, preferably comprising a remote cutting system, equipped with a CO2 laser source which can be moved by means of galvo motors along at least two axes, and provided with focusing means.

The pattern comprises at least one score line 2 which extends alternatively along opposed directions with respect to a centreline C of the pattern, and which defines adjacent portions 5*a,* 5*b* of the paper item.

The pattern to be provided can be stored or acquired in a memory unit associated with a control unit of the laser apparatus 100, adapted to mark the at least one score line 2, 3, 4 on the paper item 1.

The laser parameters are set according to the pattern to be marked, and in particular according to the shape and/or the dimensions of the at least one score 2, 3, 4, and/or the depth of the at least one score line 2, 3, 4 into the paper item, and/or the relative distance that the score line 2 shall maintain with respect to the centreline C.

In particular, according to a possible embodiments, the least one score line 2, 3, 4 of the predetermined pattern to be marked has a depth comprised between 20% and 60% of the thickness of the paper item, preferably between 40% and 50% of the thickness of the paper item, and the laser beam is set to mark the paper item in the perpendicular direction to the plane of the paper item 1 with a depth comprised between 20% and 60% of the thickness of the paper item, preferably between 40% and 50% of the thickness of the paper item 1.

The laser parameters which can be set comprise the spot dimension, the power, and the energy per unit area of the laser beam, the scanning speed of the laser apparatus. In other words, the parameters of the laser apparatus are set of the score line 2, 3, 4 to be formed on the paper item 1 by means of the laser apparatus 100 is obviously defined according to the acquired pattern and is therefore determined or calculated, for example by the control unit, based on it.

The method according to the invention comprises a third step of folding the paper item 1 such that the adjacent portions 5*a,* 5*b* project at least partially outwards with respect to the surface S of the paper item 1 outside the adjacent portions 5*a,* 5*b*.

It has to be noted that the wording "outside the adjacent portions 5*a,* 5*b*" means the area of the paper item 1 which does not comprise the adjacent portions 5*a,* 5*b*.

In other words, with reference for example to FIGS. 2B, 4, 5A-5B and 6 when the paper item 1 is folded, the adjacent portions 5*a,* 5*b* project at least partially outwards with respect to the surface S of the paper item 1 which is not marked or deformed by the creasing 10, i.e. which is arranged externally with respect to the pattern defined by the score line 2.

Figure 6:
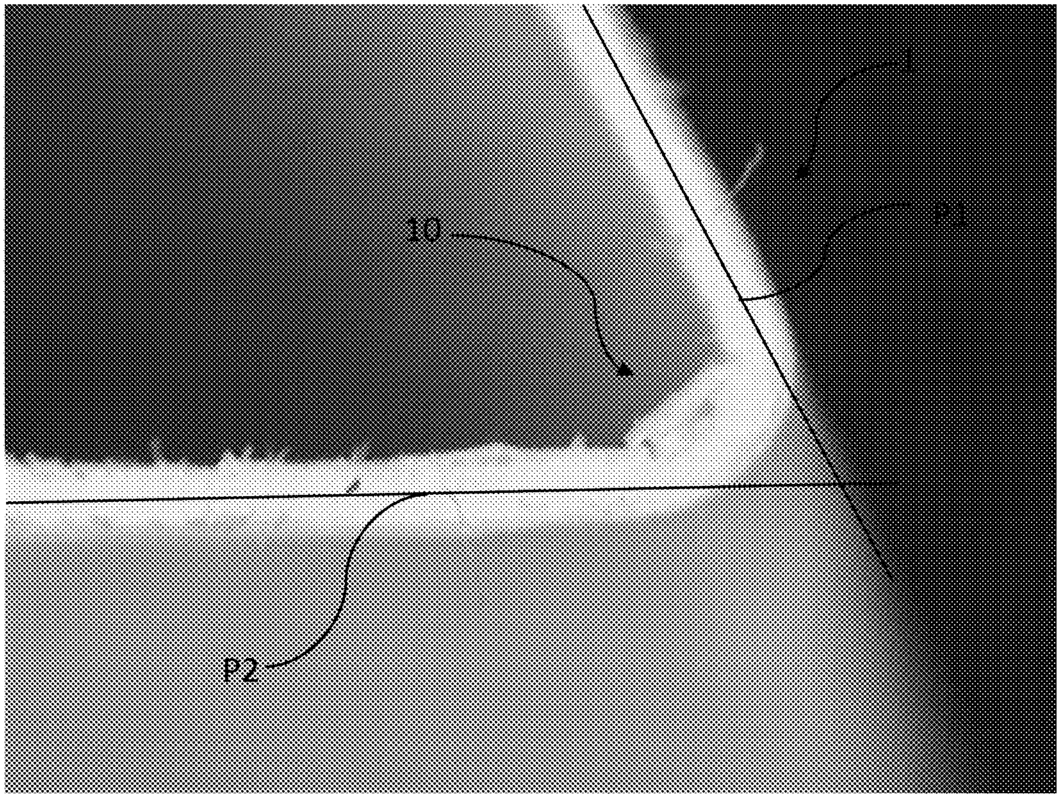
FIG. 6 shows the external surface of a possible embodiment of a paper item comprising a creasing according to the invention in its folded configuration.

With reference to FIG. 6, showing the external surface of a possible embodiment of a paper item 1 comprising a creasing 10 in its folded configuration, the undesired stretching effect of the external fibers of the paper item is avoided, due to the presence of the adjacent portions projecting outwardly that strengths the creasing while facilitating the folding step of the paper item.

As above discussed, the adjacent portions 5*a,* 5*b* comprise anchoring parts 6 that, after the step of folding the paper item 1, remain attached to the paper item 1 and end parts 7 that project at least partially outward with respect to the surface S of the paper item outside said adjacent portions 5*a,* 5*b*.

It has to be noted that the paper item 1 has a planar extension before being marked and folded.

After the step of folding the paper item 1 is operated, the paper item 1 results folded along the creasing 10 for extending along at least two planes P1, P2 that are incident one to another, and wherein the adjacent portions 5*a,* 5*b* project at least partially with respect to the planes P1, P2 along which at least a portion of the paper item 1 is extending when folded.

In a possible embodiment, the folding step comprises folding the paper item 1 in at least two planes P1, P2, which are incident one to another preferably at an angle of substantially 90°, such that the adjacent portions 5*a,* 5*b* project at least partially with respect to the planes P1, P2 along which at least a portion of the paper item 1 is extending when folded.

As above mentioned, according to a possible embodiment, each adjacent portion 5*a,* 5*b* has a tapered configuration in the direction from its anchoring part 6 to its end part 7, preferably a substantially triangular shape.

Each adjacent portion 5*a,* 5*b* has a substantially triangular shape, as shown by way of example in FIG. 2A and 3, wherein the anchoring part is the base of the triangle and the end part 7 comprises the vertex opposed to the base of the triangle.

It has to be noted that the anchoring parts 6 are areas of the adjacent portions 5*a*, 5*b* which do not comprise the at least one score line 2 which extends alternatively along opposed directions with respect to a centreline C of the pattern, and which defines adjacent portions 5*a,* 5*b* of the paper item. In this way, the paper item 1 can be folded along the anchoring parts 6 which remain attached to the surface S of the paper item 1.

Nevertheless, according to a possible embodiment, the step of marking the predetermined pattern on a surface S of the paper item comprises marking at least one score dot 3, preferably a couple of score dots 3, at each anchoring part 6 such that the paper item 1 can be folded along the anchoring parts 6 which remain attached to the surface S of the paper item 1.

The score dots 3 are marked, or scored, or engraved along the longitudinal direction of extension of the anchoring part 6 by the laser beam that cuts partially into the paper item surface S, and not through it.

The presence of score dots 3 facilitates the operation of folding the paper item 1 along the anchoring parts 6.

According to a further possible embodiment, the step of marking the predetermined pattern on a surface S of the paper item comprises marking at least one straight line 4 at each anchoring part 6, such that the paper item 1 can be folded along the straight lines 4 of the anchoring parts 6 which remain attached to the surface S of the paper item 1.

The straight lines 4 are marked, or scored, or engraved along the longitudinal direction of extension of the anchoring part 6 by a laser beam that cuts partially into the paper item surface S, and not through it.

The presence of straight lines 4 facilitates the operation of folding the paper item 1 along the anchoring parts 6.

It has to be noted that according to a possible embodiment of the method, the score dots 3 and/or the straight lines 4 of the anchoring parts 6 can be partially cut into the paper item surface S in order to reach a lower depth in the surface S of the paper item 1 than the depth reached by the first score line 2 which extends alternatively along opposed directions with respect to a centreline C of the pattern, and which defines adjacent portions 5*a,* 5*b* of the paper item.

The invention claimed is:

1. A method for forming a creasing (10) on a paper item (1) comprising:

providing a predetermined pattern to be marked on the paper item;

marking said predetermined pattern on a surface (S) of said paper item to provide at least one score line (2, 3, 4) on said paper item; wherein said pattern comprises at least one score line (2) which extends alternatively along opposed directions with respect to a centreline (C), and which defines adjacent portions (5*a*, 5*b*) of said paper item; and folding said paper item such that said adjacent portions (5*a*, 5*b*) project at least partially outwards with respect to the surface (S) of the paper item outside said adjacent portions (5*a*, 5*b*), wherein the adjacent portions (5*a*, 5*b*) comprise anchoring parts (6) that remain attached to the paper item and end parts (7) that project at least partially outward with respect to the surface (S) of the paper item outside said adjacent portions (5*a*, 5*b*).

2. The method according to claim 1, wherein the anchoring parts (6) of two adjacent portions (5*a*, 5*b*) are equidistant from the centreline (C).

3. The method according to claim 1, wherein the anchoring parts (6) and the end parts (7) are alternating along the direction of extension of the centreline (C).

4. The method according to claim 3, wherein the anchoring part (6) and the end part (7) of each adjacent portion (5*a*, 5*b*) are arranged at opposite sides of said centreline (C).

5. The method according to claim 1, wherein the centreline (C) divides each adjacent portion (5*a*, 5*b*) whereby the anchoring part (6) and at least part of the end part (7) of each said adjacent portion (5*a*, 5*b*) are arranged in opposite positions relative to the centreline.

6. The method according to claim 1, wherein said at least one score line (2) which extends alternatively along opposed directions with respect to a centreline (C) defines adjacent portions (5*a*, 5*b*) having a complementary shape.

7. The method according to claim 6, wherein the complementary shape is along the arrangement in succession of the adjacent portions (5*a*, 5*b*) in the direction of extension of the centreline (C).

8. The method according to claim 1, wherein each of the adjacent portions (5*a*, 5*b*) has a tapered configuration in the direction from its anchoring part (6) to its end part (7).

9. The method according to claim 1, wherein each of the adjacent portions has a substantially triangular shape.

10. The method according to claim 1, wherein after said folding, said paper item extends along at least two planes (P1, P2) that are incident one to another and wherein the adjacent portions (5*a*, 5*b*) project at least partially with respect to said planes (P1, P2) along which at least a portion of the paper item is extending when folded.

11. The method according to claim 1, wherein said marking said predetermined pattern on a surface(S) of said paper item to provide at least one score line (2, 3, 4) is carried out by means of a laser beam.

12. A method for forming a creasing (10) on a paper item (1), said method comprising:

providing a predetermined pattern to be marked on the paper item; and marking said predetermined pattern on a surface(S) of said paper item to provide at least one score line (2, 3, 4) on said paper item; wherein said pattern comprises at least one score line (2) which extends alternatively along opposed directions with respect to a centreline (C), and which defines adjacent portions (5*a*, 5*b*) of said paper item, wherein the adjacent portions (5*a*, 5*b*) are adapted to project at least partially outwards with respect to the surface(S) of the paper item outside said adjacent portions (5*a*, 5*b*), and comprise anchoring parts (6) adapted to remain attached to the paper item and end parts (7) that project at least partially outward with respect to the surface(S) of the paper item outside said adjacent portions (5*a*, 5*b*) when said paper item (1) is folded, and wherein the step of marking said predetermined pattern on a surface(S) of said paper item to provide at least one score line (2, 3, 4) is carried out by means of a laser beam.

13. A machine for providing a method for forming a creasing (10) on a paper item (1) according to claim 12, said machine comprising a laser apparatus (100).

14. A paper item (1) comprising a predetermined pattern marked on a surface(S) of said paper item to provide at least one score line (2, 3, 4) for forming a creasing, wherein said pattern comprises at least one score line (2) which extends alternatively along opposed directions with respect to a centreline (C), and which defines adjacent portions (5*a*, 5*b*) of said paper item, wherein said at least one score line (2, 3, 4) of said predetermined pattern has a depth between 20% and 60% of the thickness of the paper item and the adjacent portions (5*a*, 5*b*) are adapted to project at least partially outwards with respect to the surface(S) of the paper item outside said adjacent portions (5*a*, 5*b*), and comprise anchoring parts (6) adapted to remain attached to the paper item and end parts (7) that project at least partially outward with respect to the surface(S) of the paper item outside said adjacent portions (5*a*, 5*b*) when said paper item (1) is folded.

15. The paper item according to claim 14, wherein said at least one score line (2, 3, 4) of said predetermined pattern has a depth between 40% and 50% of the thickness of the paper item.

16. A paper item (1) comprising a predetermined pattern marked on a surface(S) of said paper item to provide at least one score line (2, 3, 4) for forming a creasing, wherein said pattern comprises at least one score line (2) which extends alternatively along opposed directions with respect to a centreline (C), and which defines adjacent portions (5*a*, 5*b*) of said paper item, wherein said at least one score line (2, 3, 4) of said predetermined pattern has a depth between 20% and 60% of the thickness of the paper item, wherein said paper item is formed according the method of claim 1.

* * * * *